United States Patent [19]
Coppola

[11] Patent Number: 5,493,764
[45] Date of Patent: Feb. 27, 1996

[54] COMPACT DISC REPAIR KIT AND METHOD

[76] Inventor: Gary M. Coppola, 10 Beckett St., Danbury, Conn. 06810

[21] Appl. No.: 253,270

[22] Filed: Jun. 2, 1994

[51] Int. Cl.⁶ .................................................. B23P 6/00
[52] U.S. Cl. ........................ 29/402.09; 29/402.11; 156/94; 156/98
[58] Field of Search .............. 156/94, 98; 206/310; 29/401.1, 402.01, 402.03, 402.09, 402.11

[56] References Cited

U.S. PATENT DOCUMENTS 2,663,416  12/1953  Hirsch .................................... 206/310
3,109,539  11/1963  Turoff ..................................... 206/310
5,230,130   7/1993  Bishop ................................. 156/94 X Primary Examiner—Joseph M. Gorski
Attorney, Agent, or Firm—Terrance L. Siemens

[57] ABSTRACT

A kit and method of using the same to allow the repair of a compact disc case after one or both of the "ears" that form the hinges breaks off is disclosed. The kit involves a piece of flexible adhesive backed material that can be placed on the case after both the protrusions are snapped off to form a new hinge. Thus the case can still be used, albeit with a new hinge line, the snapping off of both the protrusions allowing for the members that carry them to pass over the sides of the bottom portion of the case.

1 Claim, 4 Drawing Sheets

COMPACT DISC REPAIR KIT AND METHOD

BACKGROUND OF THE INVENTION

1. Field of the Invention

The present invention relates to a kit for the repair of broken compact disc cases. More specifically, it relates to a kit wherein, if one of the "ears" on which the case hinges while opening and closing is broken, the other can be removed, and a new hinge can be formed by placing an adhesive backed flexible material on the case to form a new hinge.

2. Description of the State of the Art

One of the problems with the compact disc format as it has been standardized is that the cases in which the discs are stored are made of a frangible plastic, and thus are prone to breakage. Most commonly, the part of the unit that breaks are the orthogonal members or edges that carry the "ears" or small protrusions on the top portion of the case. These members and their corresponding protrusions form the hinge of the case by cooperating with corresponding depressions on the bottom portion for the opening and closing thereof. If one of these protrusions shears or breaks off, the case is made worse than useless, and this can lead to accidental marring of the optical read surface of the disc, thus degrading the sound or data quality. The present invention seeks to remedy this problem by providing a kit and method of using same that will allow the user to repair the case after the breaking of one or both of these "ear" carrying members. Objects such as notebook covers, book jackets, and like objects occasionally tear or break, such that one side or panel of the cover or jacket becomes detached from the remainder of the object. Adhesive tapes have been manufactured and made available for common household repairs, such as this type of repair. Generally, the tape is applied so as to overlap the detached members, adhering to both, and the detached members are thus joined. No part of the object need be removed to enable a successful repair.

Repair by applying adhesive strips, or tape, to a book jacket, notebook cover, or the like, is not seen to describe the instant invention as claimed.

SUMMARY OF THE INVENTION

The present invention is a kit and method of using the same to allow the repair of a compact disc (CD) case after one or both of the "ears" that form the hinges breaks off. The kit involves a piece of flexible adhesive backed material that can be placed to form a new hinge after both the members carrying the protrusions are snapped off. Thus the case can still be used, albeit with a new hinge line, the snapping off of both the protrusion carrying members allowing for the members that carry them to pass over the sides of the bottom portion of the case.

Accordingly, it is a principal object of the invention to provide a kit that allows for the repair of a CD case after one of the hinge ears has been broken off by removing the other hinge protrusion, and forming a new hinge line by connecting the top and bottom portions of the case with an adhesive backed flexible material.

It is an object of the present invention to provide improved elements and arrangements thereof in a kit and method therefor for the purposes described which is inexpensive, dependable and fully effective in accomplishing its intended purpose.

These and other objects of the present invention will become readily apparent upon further review of the following specification and drawings.

BRIEF DESCRIPTION OF THE DRAWINGS

The invention will be better understood when considered with respect to the following drawings in which.

Similar reference characters denote corresponding features consistently throughout the attached drawings.

DETAILED DESCRIPTION OF THE PREFERRED EMBODIMENT

Figure 1:
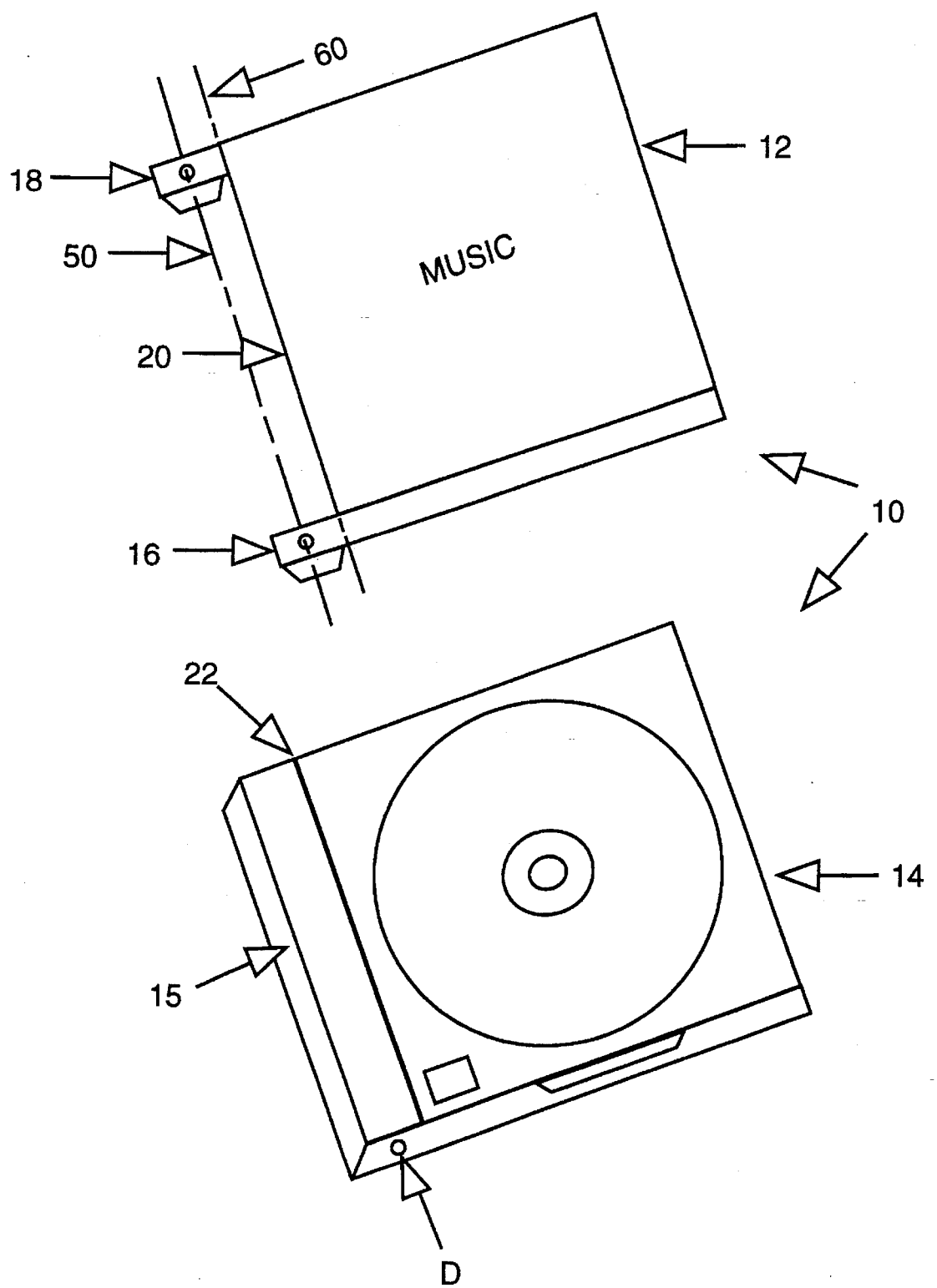
FIG. 1 is an exploded view of a typical CD case.

Referring to FIG. 1 there is shown a typical CD case 10 as is commonly sold to contain the disc media (not shown). The case 10 has a top portion 12 and a bottom portion 14. The bottom portion has a rear periphery 15 that will be discussed further below. The top portion 12 is generally planar and has a pair of orthogonal edges 16, 18 that extend rearwardly from the planar top portion 12. The top portion has a rear periphery 20 that is proximate to the rearwardly extending portion of each of these members. Carried on each of the members 16, 18 is a protrusion P (best seen in FIG. 3) that cooperates with a pair of depressions D (seen in FIG. 2) carried on the bottom portion 14 of the case 10. These protrusions P are made of the same brittle polymer type material as the main body of the case and as such both the protrusions P and the carrying members 16, 18 thereof can be potentially broken off by accident. This typically makes the case unfit for use and the handling of it risky as the disc (not shown) contained therein can easily fall out or be otherwise marred. The user is then often forced to buy another case to contain the disc.

Bottom portion 14 includes a back edge portion 15 with edge 22 that abuts against edge 20 of the top portion 12 as it swings about original hinge line 50 formed by protrusions P turning in depressions D.

Figure 2:
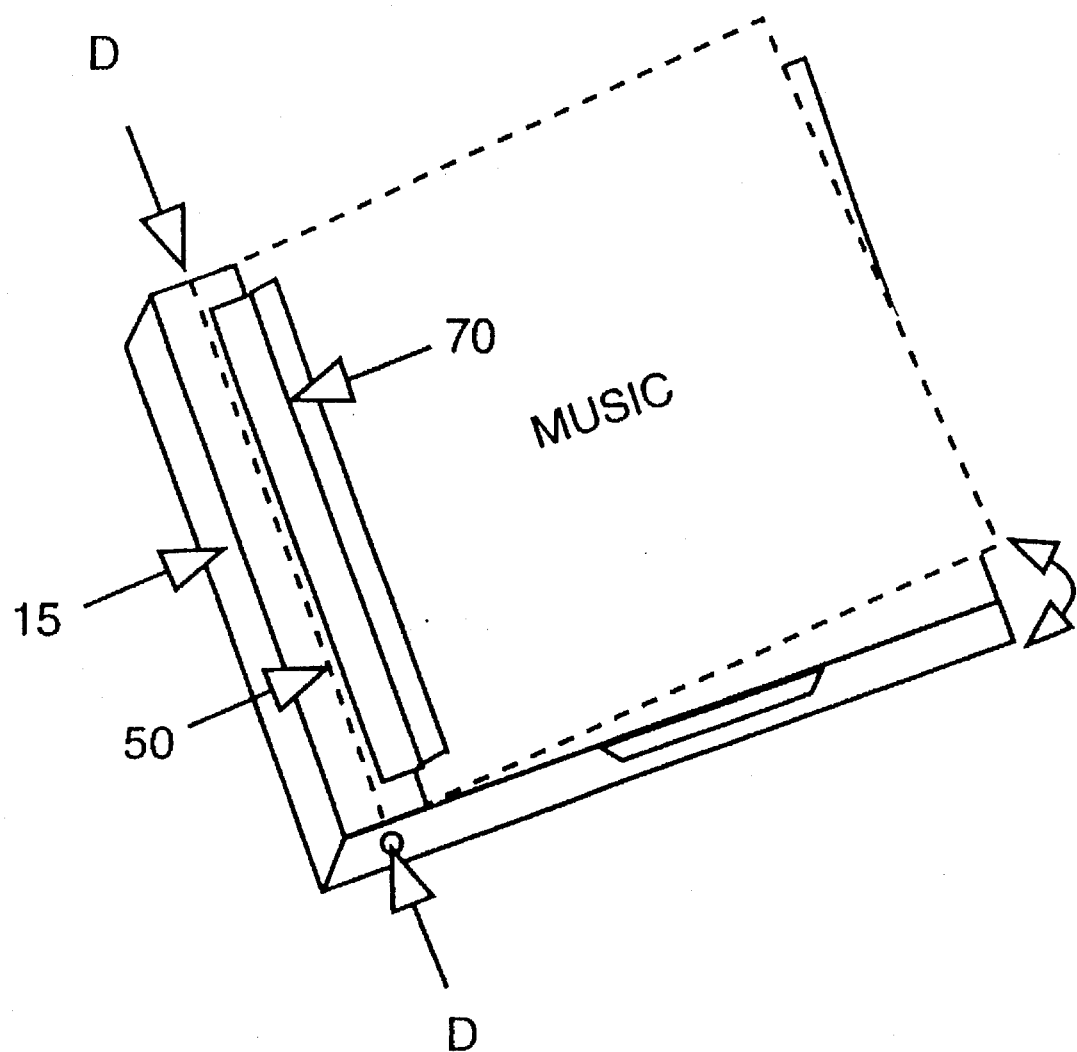
FIG. 2 is a perspective view of the back of a CD case, with a phantom line showing of the top portion of the case, and the position of the flexible replacement hinge in relation to the top and the bottom thereof.
Figure 2A:
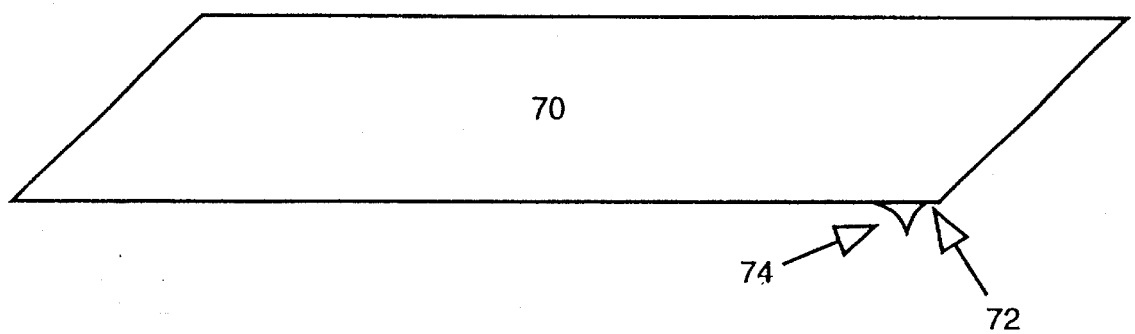
FIG. 2A is a perspective view of the adhesive backed hinge used with a portion of the protective backing partially peeled away.
Figure 3:
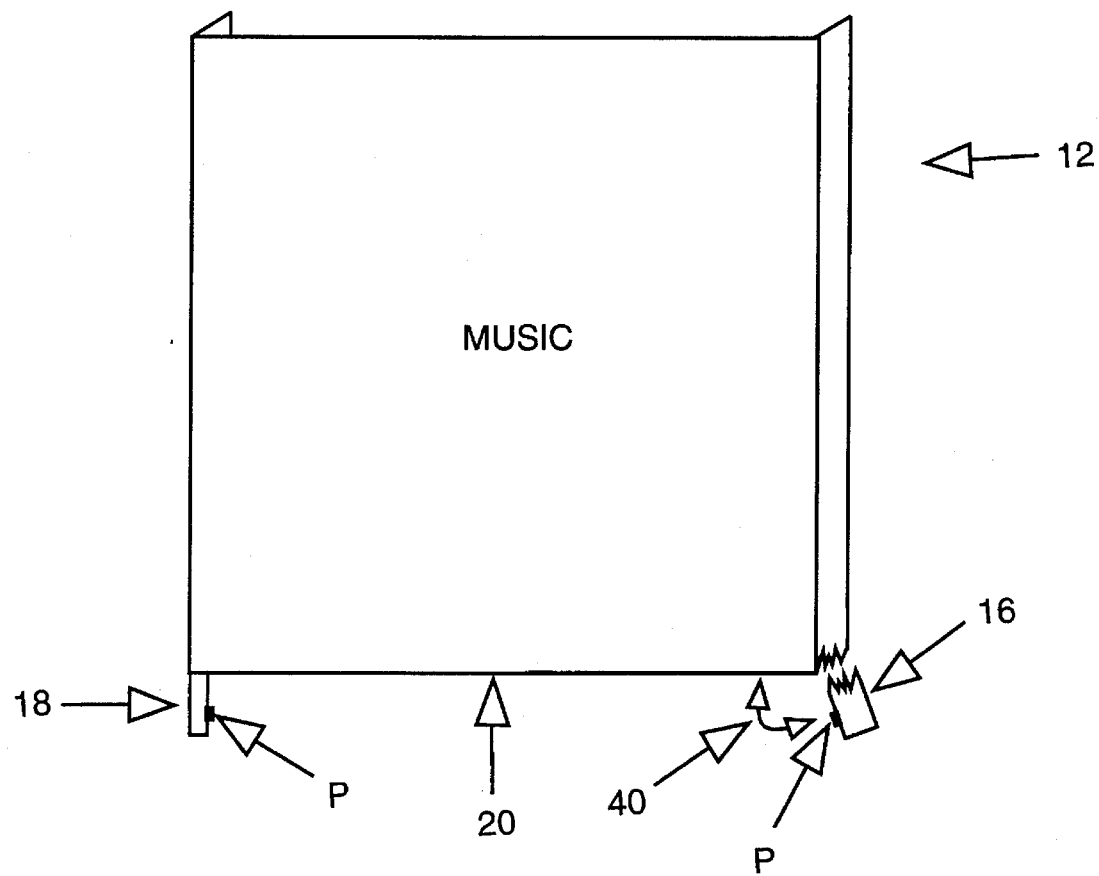
FIG. 3 is a top view of the top portion of the case, showing the position of the hinging "ears".

The discussion now turns to the operation of the present invention. The breaking of one of the protrusions P as shown in FIG. 3 is common. As can be understood from the drawings, once one of the protrusions has been broken off, the case 10 is unfit for the containment of the disc, by virtue of the fact that with only one cooperating depression D and protrusion P, the top portion 12 and bottom portion 14 can no longer be rotated freely along the original hinge line 50 (seen in FIG. 2) that extends between the pair of depressions D in the bottom portion 14 of the case 10. What is contemplated in the present invention is to remove the remaining protrusion P, by breaking or snapping it off as is indicated at 40 in FIG. 3 which then allows the user to define a second or repair hinge line or axis defined by the proximal relationship between the rear periphery 20 of the top portion 12 and the rear periphery 22 of the bottom portion 14. This is done by manipulating them into abutting position such as is shown in FIG. 2 and attaching one to the other by utilizing a flexible piece of material 70 having an adhesive surface 72. It is contemplated that the adhesive surface 72 would be covered by a non-adhesive strip 74 that would allow for easier shipping and handling. Of course it should be understood that a strip of material could be utilized that did not have an integral adhesive portion and that the adhesive could be applied by the user to either the material 70 or the top and bottom portions 12, 14 of the case 10. Once the tape is applied, it forms a new hinge line 60 along abutted edges 20 and 22, clearly shown in FIG. 1.

Material 70 could be tesa premium grade vinyl tape as can be purchased from UMC Tape & Packaging of New York, N.Y. This tape is ideal for the creation of the live hinge of this invention. It has a high tensile strength and a thin film thickness for easy flexing. The rubber adhesive forms an excellent grip with the material of the case.

It is to be understood that the present invention is not limited to the sole embodiment described above, but encompasses any and all embodiments within the scope of the following claims.

I claim:

1. A method for repairing a damaged plastic CD case wherein said case originally has a top portion with two ears and a back edge interconnecting the two ears, and a bottom portion with a forward-facing edge and two sides hingedly receiving the ears, respectively, such that the top portion is pivotable between an open and closed position relative to the bottom portion about an original hinge line passing through the two ears and parallel to said back edge, wherein said back edge and said forward facing edge abut one another when said top portion is in said closed position, and wherein said damaged CD case has one of said ears being broken and the other being undamaged, the method comprising the steps of:

breaking off the other of said ears;

abutting said back edge and said forward-facing edge with said top portion in said closed position; removing a protective portion from an adhesive vinyl tape; and applying said adhesive vinyl tape to said top and bottom portions across said abutting edges, thereby forming a new hinge line parallel to and offset from said original hinge line, about which said top portion is pivotable between an open and closed position relative to said bottom portion.

\* \* \* \* \*